May 24, 1932.   E. TIMBS   1,859,809

WELD LOCK ROTARY TOOL JOINT WITH LOCK RING SUB

Filed Aug. 23, 1930

Inventor
Edward Timbs
By Lyon & Lyon
Attorneys

Patented May 24, 1932

1,859,809

UNITED STATES PATENT OFFICE

EDWARD TIMBS, OF LOS ANGELES, CALIFORNIA, ASSIGNOR TO THE NATIONAL SUPPLY COMPANY, OF TOLEDO, OHIO, A CORPORATION OF OHIO

WELD LOCK ROTARY TOOL JOINT WITH LOCK RING SUB

Application filed August 23, 1930. Serial No. 477,347.

This invention relates to weld lock rotary tool joint with lock ring subs, and more particularly to a tool joint provided with a lock ring for the purpose of providing or insuring a fluid-tight joint against high fluid pressures desired in deep drilling and to protect the tool joint against elevator shoulder wear.

It is known that the present type of tool joints creep and sometimes back off on their threads slightly, giving the mud fluid which is of an abrasive character, especially under conditions where high fluid pressures are employed as in deep drilling, an excellent opportunity to cut through the tool joint.

It is also well known that tool joints as now constructed are subjected to extreme wear at the elevator supporting shoulders because of the freedom of action which is provided between such elevators and the tool joints, and because of the extremely heavy weights being supported on elevators from the tool joint shoulders.

It is an object of this invention to provide a tool joint which may be locked against backing off on its threads and which provides a fluid-tight joint against high pressure fluids such as are desired in deep drilling, and which provides a removable wear-taking shoulder which will absorb the wear occasioned by the lifting of the drilling strings during the drilling operations.

Another object of this invention is to provide a tool joint which is fitted with a lock ring which may be welded in position to the lower end of the tool joint and to the tool string secured to the tool joint to provide a fluid-tight joint and which ring also provides a removable wear-absorbing shoulder.

Another object of this invention is to provide a tool joint having an elongated skirt to which a protecting and fluid-tight joint-forming ring may be welded to provide a removable shoulder, and which skirt permits, because of its elongation, the salvage of the tool joint when necessary or desirable by the removal of the locking rings and refacing the joints on the ends of the extended skirts.

Other objects and advantages of this invention it is believed will be apparent from the following detailed description of a preferred embodiment thereof as illustrated in the accompanying drawings.

Figure 1:
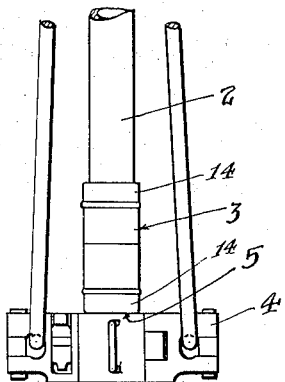
Figure 1 is a side elevation of a rotary drill stem including tool joints embodying my invention and illustrated as being suspended by the well elevator.
Figure 2:
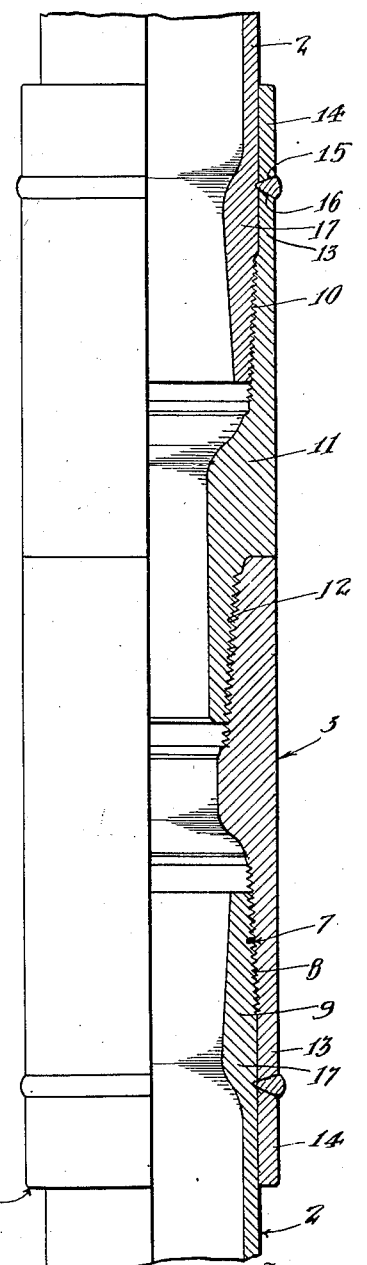
Figure 2 is an enlarged elevation in vertical mid-section of a tool joint embodying my invention illustrating the same as provided with a lock ring welded to the elongated skirt of the tool joint and to the drill stem.

In the preferred embodiment of my invention illustrated in the accompanying drawings, 1 illustrates a drill stem, the sections 2 of which are coupled together by means of tool joints 3 embodying my invention. The drill stem 1 is supported by an elevator 4 which is engaged against the shoulder 5 provided by the removable lock rings 14 of the tool joints 3.

The tool joint embodying my invention includes a box end joint 7 which is threaded at the tapered threads 8 to the upper tapered ends 9 of one drill stem section 2. The upper section 2 of the drill stem is threaded at the tapered threads 10 within the pin end portion 11 of the tool joint. The box portion 7 of the tool joint and the pin portion 11 of the tool joint are united at the tapered threads 12. The construction thus far described is common to tool joints as heretofore manufactured.

In forming the box and pin portions of the tool joints 3, the skirts 13 thereof are elongated and the skirts 13 are counterbored for a considerable distance to the threads 8 or 10 of the box or pin portions of the joints 3.

In order to secure the box and pin portions of the tool joint 3 to the drill stem sections 2 in a manner to provide a fluid-tight joint against the high pressure fluids desired in deep drilling and to provide removable elevator shoulders 5, locking rings 14 are mounted on the sections 2 of the drill stem before the tool joints are assembled. The tool joints and the pipe sections are then made up as tightly as possible at the threads 8 and 10.

The locking rings 14 are then moved in position and are welded to the skirts 13 at the divergeable tapered edges 15 and 16 of the lock rings 14 and skirts 13 respectively so that the weld as formed not only unites the skirts 13 of the tool joint with the lock rings 14, but also unites the skirt 13 and lock rings 14 with the sections 2 of the drill stem. This joint is formed by welding into the enlarged portions 17 of the sections 2 of the drill stem below the threads of the sections of the drill stem. The joint as thus provided is fluid-tight and also locks the threads of the tool joint to the threads of the pipe sections providing both a fluid-tight joint and a joint which will not break to permit the creeping of the threads. The lock rings 14 provide the shoulders 5 which engage the elevators and prevent wear upon the ends of the skirts 13 of the tool joints.

When it is desired to remove or salvage the tool joints, the lock rings 14 are cut away and the tool joint may be salvaged by merely refacing the end thereof at the point where the welded joint is formed and this salvaging of the tool joints is permitted by the forming of the elongated skirt 13.

Having fully described my invention, it is to be understood that I do not wish to be limited to the details herein set forth, but my invention is of the full scope of the appended claims.

I claim:

1. In a drilling stem, the combination of a tool joint connecting the sections of the drill stem including a box tool joint section screw-threaded to one section of the drill stem, a pin tool joint member screw-threaded to a second section of the drill stem, the box and pin sections of the joint being threaded together, and a lock ring welded to the end of the skirt of the box portion of the tool joint and to the section of the drill stem threaded to the box portion of the tool joint, and the ring providing a removable drill stem supporting shoulder.

2. A drill stem including a plurality of sections of drill stems connected together by a tool joint comprising box and pin portions threaded to the sections of the drill stem, and the box and pin sections of the tool joint being threaded together and including lock rings welded to the ends of the box and pin portions of the tool joint and to the sections of drill stem secured to said pipe, and the lock rings providing removable wear-absorbing drill stem supporting shoulders.

3. In a drill stem including a plurality of drill stem sections, a tool joint uniting the said sections, the tool joint including a box and a pin portion having extended skirts counterbored to the threads of said box and pin portions, the drill stem sections being threaded in the threads of said box and pin portions, lock rings mounted on the drill stem sections and the lock ring being welded at an annular weld completely around said lock rings to the adjacent ends of the skirts of the box and pin portions of said tool joints, and being welded at said weld to the sections of drill stem threaded to the box and pin portions of said tool joints.

Signed at Torrance, Calif., this 16th day of August, 1930.

EDWARD TIMBS.